United States Patent
Featonby et al.

(10) Patent No.: US 11,573,816 B1
(45) Date of Patent: Feb. 7, 2023

(54) PREFETCHING AND MANAGING CONTAINER IMAGES USING CLUSTER MANIFEST

(71) Applicant: Amazon Technologies, Inc., Seattle, WA (US)

(72) Inventors: Malcolm Featonby, Sammamish, WA (US); Richard Lee Sanders, Issaquah, WA (US); Fernando Paiva Zandona, Sammamish, WA (US); Omar Paul, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 294 days.

(21) Appl. No.: 16/913,411

(22) Filed: Jun. 26, 2020

(51) Int. Cl.
G06F 9/455 (2018.01)
H04L 67/1097 (2022.01)
H04L 67/51 (2022.01)
H04L 67/5681 (2022.01)

(52) U.S. Cl.
CPC ...... *G06F 9/45558* (2013.01); *H04L 67/1097* (2013.01); *H04L 67/51* (2022.05); *H04L 67/5681* (2022.05); *G06F 2009/45575* (2013.01)

(58) Field of Classification Search
CPC ....... G06F 9/45558; G06F 2009/45575; G04L 67/51; G04L 67/5681; G04L 67/1097
See application file for complete search history.

(56) References Cited

U.S. PATENT DOCUMENTS

| | | |
|---|---|---|
| 9,256,467 B1 | 2/2016 | Singh et al. |
| 9,549,038 B1 | 1/2017 | Anne |
| 9,910,713 B2 | 3/2018 | Wisniewski et al. |
| 9,928,108 B1 | 3/2018 | Wagner et al. |
| 10,067,801 B1 | 9/2018 | Wagner |
| 10,310,966 B1 | 6/2019 | Ge et al. |
| 10,432,551 B1 | 10/2019 | Vosshall et al. |
| 10,606,660 B1 | 3/2020 | Hartley et al. |
| 10,771,337 B1 | 9/2020 | Das et al. |
| 10,824,474 B1 | 11/2020 | Kamboj et al. |
| 10,871,995 B2 | 12/2020 | Gerdesmeier et al. |
| 11,392,422 B1 | 7/2022 | Filiz et al. |
| 11,403,150 B1 | 8/2022 | Featonby et al. |
| 11,422,844 B1 | 8/2022 | Filiz et al. |
| 2011/0246515 A1 | 10/2011 | Johnson et al. |

(Continued)

OTHER PUBLICATIONS

U.S. Appl. No. 16/217,454, filed Dec. 12, 2018, Aithal et al.

(Continued)

*Primary Examiner* — Chris Parry
*Assistant Examiner* — Steven C Nguyen
(74) *Attorney, Agent, or Firm* — Knobbe, Martens, Olson & Bear, LLP

(57) ABSTRACT

Generally described, one or more aspects of the present application relate to prefetching container images for use in a cluster of virtual machines. For example, the cluster manifest may indicate an ordered list of image repositories and a set of container images that are likely to be executed on the cluster. Based on this indication, the set of container images can be prefetched onto the caches of the virtual machines in the cluster, such that when requests to execute those container images are eventually received, the container images can be accessed from the caches rather than from a remote repository.

20 Claims, 9 Drawing Sheets

(56) References Cited

U.S. PATENT DOCUMENTS

| | | |
|---|---|---|
| 2012/0210326 A1 | 8/2012 | Torr et al. |
| 2012/0233668 A1 | 9/2012 | Leafe et al. |
| 2013/0124807 A1 | 5/2013 | Nielsen et al. |
| 2013/0160008 A1 | 6/2013 | Cawlfield et al. |
| 2014/0079207 A1 | 3/2014 | Zhakov et al. |
| 2014/0358710 A1 | 12/2014 | Balestrieri et al. |
| 2015/0106805 A1 | 4/2015 | Melander et al. |
| 2015/0142878 A1 | 5/2015 | Hebert et al. |
| 2016/0077846 A1 | 3/2016 | Phillips et al. |
| 2016/0378559 A1 | 12/2016 | Bhandarkar et al. |
| 2017/0063659 A1 | 3/2017 | Platon et al. |
| 2017/0078433 A1 | 3/2017 | Radhakrishnan et al. |
| 2017/0090961 A1 | 3/2017 | Wagner et al. |
| 2017/0115978 A1 | 4/2017 | Modi et al. |
| 2017/0177413 A1 | 6/2017 | Wisniewski et al. |
| 2017/0177860 A1 | 6/2017 | Suarez et al. |
| 2017/0177877 A1* | 6/2017 | Suarez ............... G06F 16/2455 |
| 2017/0180346 A1 | 6/2017 | Suarez et al. |
| 2017/0339158 A1 | 11/2017 | Lewis et al. |
| 2017/0339196 A1 | 11/2017 | Lewis et al. |
| 2018/0088993 A1 | 3/2018 | Gerdesmeier et al. |
| 2018/0101403 A1 | 4/2018 | Baldini Soares et al. |
| 2018/0129539 A1 | 5/2018 | Sadat |
| 2018/0150325 A1 | 5/2018 | Kuo et al. |
| 2018/0246745 A1 | 8/2018 | Aronovich et al. |
| 2018/0285204 A1 | 10/2018 | Dwarampudi et al. |
| 2018/0331971 A1 | 11/2018 | Certain et al. |
| 2019/0050680 A1* | 2/2019 | Waugh ............... G06K 9/6218 |
| 2019/0102231 A1 | 4/2019 | Wagner |
| 2019/0108049 A1 | 4/2019 | Singh et al. |
| 2019/0146774 A1 | 5/2019 | Moore et al. |
| 2019/0188107 A1 | 6/2019 | Alston et al. |
| 2019/0243681 A1 | 8/2019 | Chen |
| 2019/0294477 A1 | 9/2019 | Koppes et al. |
| 2019/0324786 A1 | 10/2019 | Ranjan et al. |
| 2019/0340033 A1 | 11/2019 | Ganteaume |
| 2019/0347127 A1 | 11/2019 | Coady et al. |
| 2019/0392045 A1* | 12/2019 | De Lima Junior . G06F 12/0875 |
| 2020/0073649 A1 | 3/2020 | Viana et al. |
| 2020/0142711 A1 | 5/2020 | Varda et al. |
| 2020/0174842 A1 | 6/2020 | Wang et al. |
| 2020/0213279 A1 | 7/2020 | Xiong et al. |
| 2020/0241930 A1 | 7/2020 | Garg et al. |
| 2020/0249977 A1 | 8/2020 | Mentz et al. |
| 2020/0310845 A1 | 10/2020 | Liguori et al. |
| 2020/0310850 A1 | 10/2020 | Liguori et al. |
| 2020/0356387 A1* | 11/2020 | Anwar ............... G06F 9/44578 |
| 2020/0358719 A1 | 11/2020 | Mestery et al. |
| 2020/0412596 A1 | 12/2020 | Cherunni |
| 2021/0064442 A1 | 3/2021 | Alluboyina et al. |
| 2021/0089361 A1 | 3/2021 | Rafey et al. |
| 2021/0109775 A1 | 4/2021 | Shen et al. |
| 2021/0117217 A1 | 4/2021 | Croteau et al. |
| 2021/0141655 A1 | 5/2021 | Gamage et al. |
| 2021/0158083 A1 | 5/2021 | Gan et al. |
| 2021/0160162 A1 | 5/2021 | Abbas |
| 2021/0184942 A1 | 6/2021 | Tootaghaj et al. |
| 2021/0232344 A1* | 7/2021 | Corrie ...................... G06F 8/63 |

OTHER PUBLICATIONS

U.S. Appl. No. 16/367,801, filed Mar. 28, 2019, Featonby et al.
U.S. Appl. No. 16/699,309, filed Nov. 29, 2019, Goodman et al.
U.S. Appl. No. 16/909,756, filed Jun. 23, 2020, Featonby et al.
Dettori, "Blueprint for Business Middleware as a Managed Cloud Service", IEEE International Conference on Cloud Engineering, 2014, pp. 261-270.

* cited by examiner

CLUSTER MANIFEST 202

ORDERED LIST OF REPOSITORIES:
REPOSITORY_A2
REPOSITORY_A1
REPOSITORY_C
REPOSITORY_B

CONTAINER IMAGES:
USERCODE1.LATEST
USERCODE2.LATEST
USERCODE3.BETA

FALLBACK TO PUBLIC HUB?
YES

*FIG. 2*

PREFETCHING AND MANAGING CONTAINER IMAGES USING CLUSTER MANIFEST

BACKGROUND

Modern computer systems are frequently implemented as distributed collections of computer systems operating collectively within one or more host computer system environments. Such a host computer environment may deploy applications across multiple clusters of servers or virtual machines and manage the applications and the clusters on behalf of customers.

BRIEF DESCRIPTION OF THE DRAWINGS

FIG. 2 depicts a block diagram of a cluster manifest in accordance with aspects of the present disclosure.

DETAILED DESCRIPTION

Introduction

Figure 1:
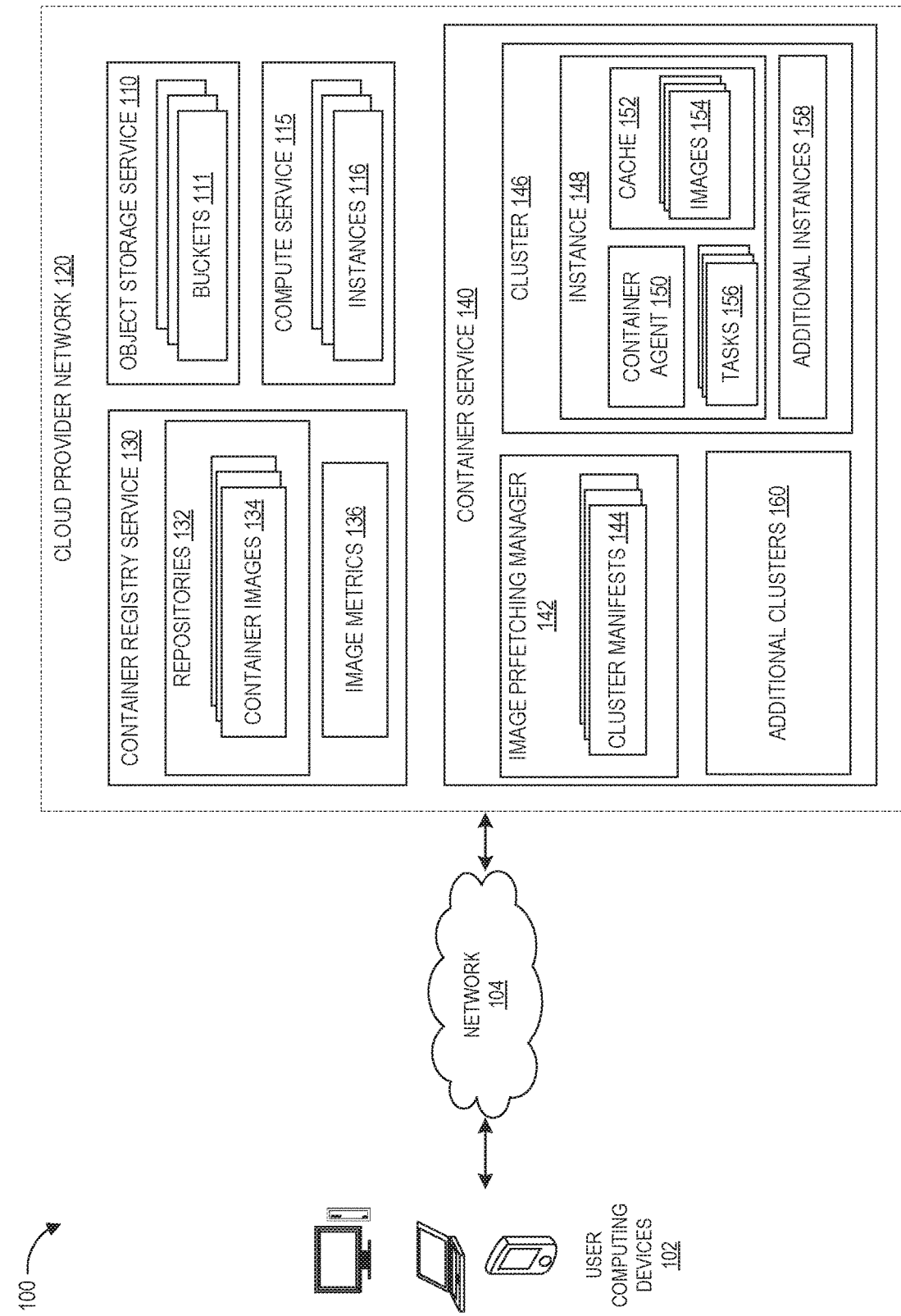
FIG. 1 depicts a schematic diagram of a network environment in which a cloud provider network is used to implement a container service and an image prefetching manager in accordance with aspects of the present disclosure.

The present disclosure generally relates to improving container launch times by predictive prefetching of sets of container image layers that have been determined as likely to be used together to execute a particular task. Many software applications can run using one or more computing "clusters," which can include at least one cluster master (which runs control processes including scheduling, resource control, handling API requests, and deciding what runs on the cluster's nodes) and multiple nodes (which are the worker machines that run containerized applications and other workloads). These clusters can run across a number of physical machines in a distributed computing environment such as a cloud provider network.

A developer can package a software application and everything else needed to run the application in a container image (e.g., a standalone, executable package of software that includes everything needed to run an application process) and send a request to the cloud provider network to execute the application in a cluster. In the request, the developer may indicate where the container image can be found, typically in an image repository within the cloud provider network or in a public image repository outside the cloud provider network. However, the size of these container images can get quite large, and having to download them from remote repositories can significantly delay the application launch time.

The aforementioned challenge, among others, is addressed in some embodiments by the disclosed techniques for prefetching container images into the cache of the individual compute instances of a cluster such that when a user requests execution of those container images on the cluster, the container images can be launched from the cache, rather than from a remote container image repository.

More specifically, the presently disclosed technology addresses these deficiencies by allowing the user to provide a cluster manifest that indicates the identity of the repositories from which the user expects to store the container images, and a set of container images that are likely to be needed as part of future execution requests sent to the cloud provider network. By allowing some or all of the container images indicated by the cluster manifest to be prefetched, the presently disclosed technology can significantly reduce the latency associated with application launch times (e.g., from receiving the request to initiating the execution of the application), thereby providing an improved and more efficient application execution experience to the user.

As will be appreciated by one of skill in the art in light of the present disclosure, the embodiments disclosed herein improve the ability of computing systems, such as container systems and code execution systems, to provide mechanisms for reducing the latency associated with code execution on clusters provided by a cloud provider network. By allowing the container images to be prefetched prior to execution requests requiring those container images, the cloud provider network of the present disclosure can address the deficiencies described above.

Prior techniques generally relied on caching previously used container images, and potentially loading the container images from the cache if another execution request needs the same container images before the container images in the cache are overwritten. However, such approaches would provide guaranteed cold starts for all code executions that occur for the first time in a given compute capacity (e.g., computing resources, which may be virtualized or bare-metal, that can be used to perform the code executions) since the cache would be empty. In contrast, embodiments of the present disclosure enable the caches of the compute capacity when such compute capacity is added to the cluster, and by the time code execution requests requiring the container images are received, some or all of the container images may already be stored in the cache, thereby reducing the time it takes to initiate the execution of the requested applications.

The presently disclosed embodiments therefore address technical problems inherent within computing systems, such as the latency associated with on-demand code execution on a cloud provider network, especially on compute capacity newly added to a cluster. These technical problems are addressed by the various technical solutions described herein, including allowing users to provide cluster manifests and prefetching container images using those cluster manifests. Thus, the present disclosure represents an improvement on existing software execution systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Container Service and Prefetching Manager FIG. 1 depicts an example computing environment 100 including a cloud provider network 120 in which the disclosed container service and prefetching manager can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for prefetching and managing container images may be implemented in non-elastic computing environments as well.

The cloud provider network 120 can be accessed by user computing devices 102 over a network 104. The cloud provider network 120 may include a container registry service 130, a container service 140 (referred to in various implementations as a container service, cloud container service, container engine, or container cloud service), an object storage service 110, and a compute service 115 (referred to in various implementations as an elastic compute service, a virtual machines service, a computing cloud service, a compute engine, or a cloud compute service) that are in networked communication with one another and with the network 104 to provide users with on-demand access to the services and resources provided by the cloud provider network 120.

In the example of FIG. 1, the container registry service 130 provides repositories 132 and image metrics 136. The repositories 132 store container images 134, and the image metrics 136 indicate certain metadata about the container images 134 such as the frequency at which each of the container images 134 is accessed from the respective one of the repositories 132, the recency of such access, dependencies between the container images (e.g., how frequently a given set of container images are loaded/executed together), availability of container images (currently or over time), availability of repositories (currently or over time), and the like.

The container service 140 provides an image prefetching manager 142, a cluster 146, and additional clusters 160. The image prefetching manager 142 manages cluster manifests 144. For example, the image prefetching manager 142 processes cluster manifests received from users at the user computing devices 102, stores the cluster manifests in association with the corresponding ones of the clusters provided by the container service 140 (e.g., cluster 146 and additional clusters 160), and facilitates prefetching of the container images listed in the cluster manifests. For example, the cluster manifests 144 may be stored in a cluster manifest repository (not shown) in storage local to the container service 140 or a storage service within the cloud provider network 120 such as the object storage service 110. The techniques for prefetching and managing container images using the cluster manifests are described in greater detail below with reference to FIGS. 2-8. Although the additional instances clusters 160 are shown in FIG. 1, in other embodiments, the container service 140 may include only a single cluster.

The cluster 146 includes an instance 148 and additional instances 158. The instance 148 includes a container agent 150 configured to perform operations on behalf of the instance 148, cache 152 storing container images 154, and tasks 156 executing on the instance 148. Although the additional instances 158 are shown in FIG. 1, in other embodiments, the cluster 146 may include only a single instance. Although some embodiments of the present disclosure are described with reference to the instances 148 and the additional instances 158 that are part of the cloud provider network 120, in other embodiments, the techniques described herein are applied to one or more instances that are outside the cloud provider network 120 (e.g., implemented using the user computing devices 102 and/or other on-premises computing resources). In some embodiments, the container images and/or the container image layers described herein are cached at the instance layer (e.g., in the example of virtual machines). In other embodiments, the container images and/or the container image layers described herein are cached below the virtualization layer such as at the underlying hardware layer (e.g., in the example of bare-metal instances)

The container service 140 may provide a set of application programming interfaces ("APIs") that can be used by the users of the user computing devices 102 to add, modify, or remove cluster manifests, add, modify, or remove compute capacity to the clusters, and/or request execution of user applications (e.g., tasks) on the clusters. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of some software container services, a task refers to a container, or multiple containers working together, running to execute the functionality of a software application or a particular component of that application. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of a cloud provider network 120 can deploy containers by managing clusters of compute instances that run container agents. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The container registry service 130 and/or the container service 140 may utilize the services provided by the compute service 115 to perform one or more of the techniques described herein (e.g., to provide the instances 148 and 158). The compute service 115 may include one or more servers which provide resizable computing capacity to users for building and hosting their software systems. The compute service 115 and associated control plane functionality can provide an elastic compute cloud service of the cloud provider network 120. Compute resources can be provided from the compute service 115 to customers via an elastic compute cloud service (referred to in various implementations as an elastic compute service, a virtual machines service, a computing cloud service, a compute engine, or a cloud compute service). Users can use the compute service 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs. The compute service 115 can also include computer storage for temporary data used while an instance is running; however, as soon as the instance is shut down this data is lost.

The cloud provider network 120 may provide the instances (also referred to as virtual compute instances, compute instances, virtual machine instances, or virtual machines) shown in FIG. 1 with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Although the instances 148 and 158 are used as examples in FIG. 1, the compute resources usable by the clusters 146 and 160 include one or more of physical machines, virtual machines, containers, nodes, or other forms of virtual or physical compute units that are configured to execute one or more applications.

In some implementations, at least a subset of virtualization management tasks may be performed at one or more offloading cards so as to enable more of the processing capacity of the host to be dedicated to client-requested compute instances—e.g., cards connected via Peripheral Component Interconnect (PCI) or Peripheral Component Interconnect Express (PCIe) to the physical CPUs and other components of the virtualization host may be used for some virtualization management components. Such an offload card of the host can include one or more CPUs and/or other computing resources that are not available to customer instances, but rather are dedicated to instance management tasks such as virtual machine management, input/output virtualization to network-attached storage volumes, local migration management tasks, instance health monitoring, and the like. Alternatively or additionally, such an offload card may provide additional computing resources usable by customer instances.

As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Additionally, the container registry service 130 and/or the container service 140 may utilize the services provided by the object storage service 110 to perform one or more of the techniques described herein (e.g., to provide the repositories 132, to store the image metrics 136, and to store the cluster manifests 144). The object storage service 110 represents another type of storage within the cloud provider network 120. The object storage service 110 and associated control plane functionality can provide an object-based storage service of the cloud provider network 120. Object-based storage services can be referred to as a blob storage service, cloud object storage service, or cloud storage service, in various implementations. The object storage service 110 include one or more servers on which data is stored as objects within resources referred to as buckets 111. Each object typically includes the data being stored, a variable amount of metadata that enables various capabilities for the object storage service 110 with respect to analyzing a stored object, and a globally unique identifier or key that can be used to retrieve the object. Objects stored on the object storage service 110 are associated with a unique identifier, such that authorized access to them can be obtained through requests from networked computing devices in any location.

Each bucket 111 is associated with a given user account. Users can store as many objects as desired within their buckets, can write, read, and delete objects in their buckets, and can control access to their buckets and the objects contained therein. For example, the instances 116 may access the buckets 111 to write, read, or delete the objects contained therein. Further, in embodiments having a number of different object storage service 110 distributed across different ones of the regions described above, users can choose the region (or regions) where a bucket is stored, for example, to optimize for latency. Users can use object storage service 110 for purposes such as storing photos on social media websites, songs on music streaming websites, or files in online collaboration services, to name a few examples. Applications developed in the cloud often take advantage of the vast scalability and metadata characteristics of the object storage service 110. The object storage service 110 can support highly parallel data accesses and transfers.

Some implementations of the cloud provider network 120 can additionally include block store servers, domain name services ("DNS") servers, relational database servers, and other server configurations (not illustrated) for supporting on-demand cloud computing platforms. Each server (or service illustrated in FIG. 1) includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable "virtual computing devices" via their use of the clusters 146 and 160 and/or the instances 116, 148, and 158 illustrated in FIG. 1. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services, which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for prefetching and managing container images can be implemented as part of a virtual compute service, container service, or Kubernetes-based container service in some embodiments.

Example Cluster Manifest

FIG. 2 depicts an example content of a cluster manifest 202. As shown in FIG. 2, the cluster manifest 202 includes an ordered list of repositories (repository_A2, repository_A1, repository_C, and repository_B, which may be part of the repositories 132 of FIG. 1). In addition, the cluster manifest 202 includes a set of container images (which may be part of the container images 134 of FIG. 1) that can be prefetched from the above-listed repositories. The cluster manifest 202 also includes a flag that indicates whether the cloud provider 120 should look in a public hub of repositories and container images, if none of the repositories in the ordered list has the container image whose execution has been requested (e.g., by the user of the cluster providing the cluster manifest 202). In the example of FIG. 2, the image prefetching manager 142 may try to prefetch all three of the container images provided in the cluster manifest 202, in response to an instance being added to the cluster associated with the cluster manifest 202.

For example, referencing the ordered list of repositories, the image prefetching manager 142 may request a container image identifiable by "usercode1.latest" from repository_A2. Here, "usercode1" may be the ID of the container image and "latest" may be the tag associated with the container image. If the container image "usercode1.latest" exists in repository_A2, the image prefetching manager 142 downloads the container image from repository_A2 and stores it in the cache of the instance. Otherwise, the image prefetching manager 142 proceeds to the next repository in the ordered list, repository_A1, and requests a container image identifiable by "usercode1.latest" from repository_A1. If the container image "usercode1.latest" exists in repository_A1, the image prefetching manager 142 downloads the container image from repository_A1 and stores it in the cache of the instance. The prefetching manager 142 may go through the ordered list until the container image is found. If none of the repositories in the ordered list has a container image identifiable by "usercode1.latest", the prefetching manager 142 checks the flag indicating whether to fall back to the public hub, and in this case, the prefetching manager 142 obtains the container image from the public hub, since the flag indicates that the prefetching manager 142 should fall back to the public hub. In addition to or instead of including the flag, the cluster manifest 202 may specify the identity of one or more fallback repositories. For example, the public hub may be DOCKER HUB®. As another example, the public hub may be a public hub provided by the cloud provider network 120 that is different from the container registry service 130. In the absence of an indication of a fallback hub/repository in the manifest 202, the image prefetching manager 142 may use one or more default hubs/repositories. In the event that the public hub does not have the container image, the prefetching manager 142 may output an error to the user providing the cluster manifest 202, indicating that the container image is not found in any of the indicated repositories. Although a process for prefetching container images is described with reference to FIG. 2, the techniques for obtaining container images can also be applied to fetching the container images in response to a request to execute those container images (e.g., as part of a task execution as described herein).

In some embodiments, a cluster does not have a manifest associated therewith when an instance is added to the cluster. In such embodiments, the image prefetching manager 142 may download one or more container images onto the cache of the instance based on historical data associated with the user associated with the cluster. Alternatively, the image prefetching manager 142 may not download any container images onto the cache when the instance is being added to the cluster.

In some embodiments, a manifest is automatically generated and associated with a cluster. For example, the image prefetching manager 142 may identify one or more repositories and/or one or more container images frequently used by the user associated with the cluster and/or by other users of the cloud provider network 120. Alternatively, the user of the cluster may provide the manifest to the container service 140, as described herein.

Example Workflow for Prefetching Container Images Using a Cluster Manifest

Figure 3:
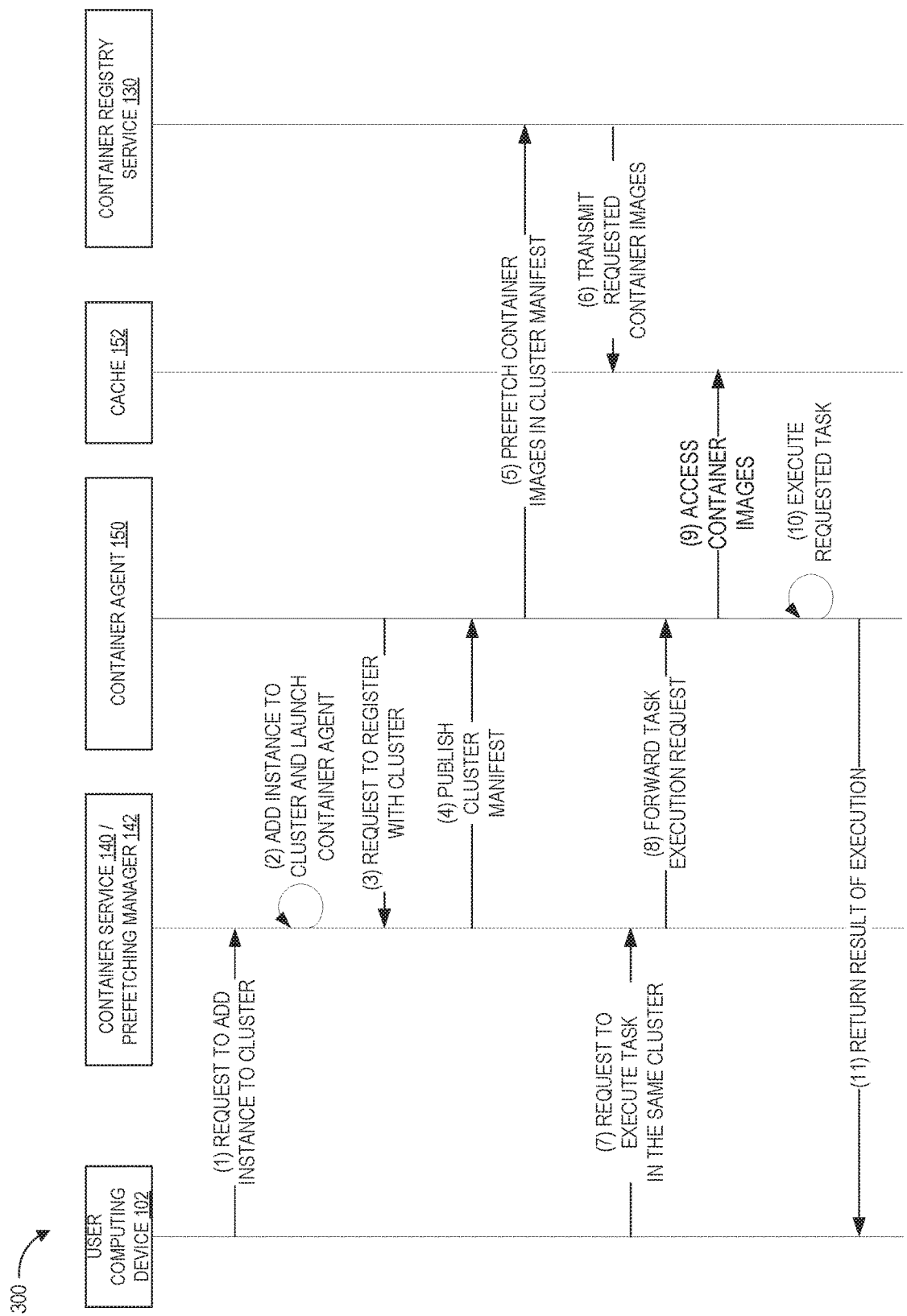
FIG. 3 depicts a workflow diagram illustrating the interactions between the various components of FIG. 1 in accordance with aspects of the present disclosure.

FIG. 3 depicts interactions among the various components shown in FIG. 1 in prefetching container images in accordance with aspects of the present disclosure. As shown in FIG. 3, at (1), the user computing device 102 calls an API provided by the container service 140 to request to add a compute instance (e.g., instance 148 of FIG. 1) to a cluster (e.g., cluster 146 of FIG. 1), where the compute instance and the cluster are both assigned to the user associated with the user computing device 102. At (2), the container service 140 adds the instance to the cluster and launches a container agent 150 on the instance.

At (3), the container agent 150 sends, to the container service 140 (or a control plane component thereof), a request to register itself with the cluster as available capacity. At (4), in response to the request from the container agent 150, the container service 140 publishes a cluster manifest (e.g., cluster manifest 202 of FIG. 2) associated with the cluster. Upon receiving the cluster manifest, the container agent 150 processes the content of the cluster manifest and sends a request to the container registry service 130 to prefetch the container images identified by (or derived from) the cluster manifest from the container registry service 130. In response to the request from the container agent 150, the container registry service 130 transmits the requested container images, which are stored in a cache 152 of the instance on which the container agent 150 is running.

After the container images have been prefetched into the cache 152, at (7), the user computing device 102 calls another API provided by the container service 140 to request to execute a task in the cluster, where the task includes the container images prefetched into the cache 152 (e.g., as indicated by the task definition associated with the request). At (8), the container service 140 forwards the task execution request to the container agent 150. In response, at (9), the container agent 150 accesses the container image whose execution is requested in the task execution request. Although not illustrated in FIG. 3, cache validation may be performed as part of (9). Such cache validation may include reading a container image from the cache 152, requesting a hash value of the container image from the container registry service 130, and comparing the hash value of the container image read from the cache 152 and the hash value received from the container registry service 130. If the hash values match or otherwise correlate, it is determined that the container image in the cache 152 has not been tampered with and is safe to be used. If the hash values do not match or otherwise correlate, a new copy of the container image is requested from the container registry 130 and used to execute the task requested at (7). In other embodiments, other known cache validation algorithms may be used. At (10), the container agent 150 causes the container images to be executed on the instance, and at (11), the container agent 150 returns the result of the execution to the user computing device 102.

Although not illustrated in FIG. 3, the workflow may also include, prior to (1), the steps of receiving, by the container service 140, a cluster manifest from the user computing device 102 and storing the cluster manifest in association with the cluster.

As illustrated, by allowing the container images to be prefetched into the cache of the instance to which the task execution request involving those container images is subsequently sent, the container service 140 reduces the launch time associated with the task execution request.

Example Routine for Registering a Compute Instance with a Cluster

Figure 4:
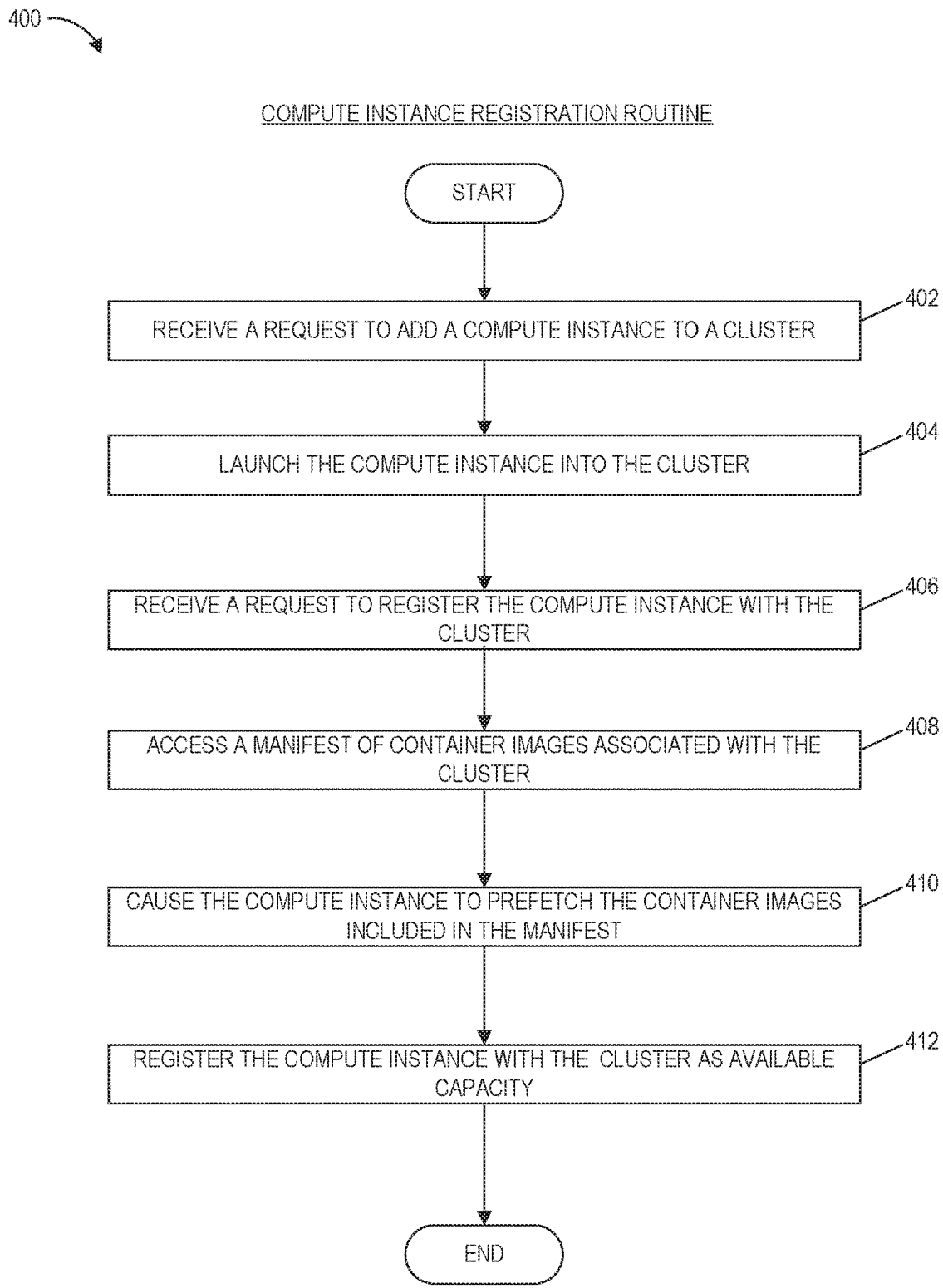
FIG. 4 is a flowchart of an example process for registering a compute instance with a cluster in accordance with aspects of the present disclosure.

FIG. 4 depicts an illustrative routine 400 for registering a compute instance with a cluster in accordance with aspects of the present disclosure. The routine 400 may be carried out, for example, by the container service 140 (or a component thereof such as the image prefetching manager 142) or one or more other components of the cloud provider network 120 described herein. For convenience, some or all of the steps of the routine 400 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the container service 140 receives a request to add a compute instance to a cluster. For example, the compute instance may be assigned to a user of the cluster, and the cluster may be configured to execute one or more tasks on behalf of the user At block 404, the container service 140 launches the compute instance into the cluster. For example, the container service 140 may utilize a machine image provided by the user of the cluster to launch the compute instance.

At block 406, the container service 140 receives a request to register the compute instance with the cluster. For example, the request may be received from a container agent (e.g., container agent 150) running on the compute instance.

At block 408, the container service 140 accesses a manifest of container images associated with the cluster. For example, the cluster manifest may indicate an ordered list of image repositories and a set of container images that are likely to be executed on the cluster.

At block 410, the container service 140 causes the compute instance to prefetch the container images included in the manifest. For example, the container service 140 may request the container images from an image repository identified in the cluster manifest, using the name of the container image and the tag associated with the container image.

At block 412, the container service 140 registers the compute instance with the cluster as available capacity. The compute instance may now be ready to be used as compute capacity for handling a task execution request on behalf of the cluster. The routine 400 may then end.

The routine 400 can include fewer, more, or different blocks than those illustrated in FIG. 4 and/or one or more blocks illustrated in FIG. 4 may be modified, omitted, or switched without departing from the spirit and scope of the description. In some embodiments, at block 408, the container service 140 accesses the image metrics 136, and at block 410, the container service 140 causes the compute instance to prefetch one or more container images indicated by the image metrics 136 to satisfy one or more prefetching conditions (e.g., based on how frequently the container images have been accessed, how recently the container images have been accessed, etc.). In other embodiments, at block 408, the container service 140 accesses the manifest and the image metrics 136, and at block 410, the container service 140 causes the compute instance to prefetch one or more container images from the repositories in the ordered list that satisfy such prefetching conditions. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Executing a Task

Figure 5:
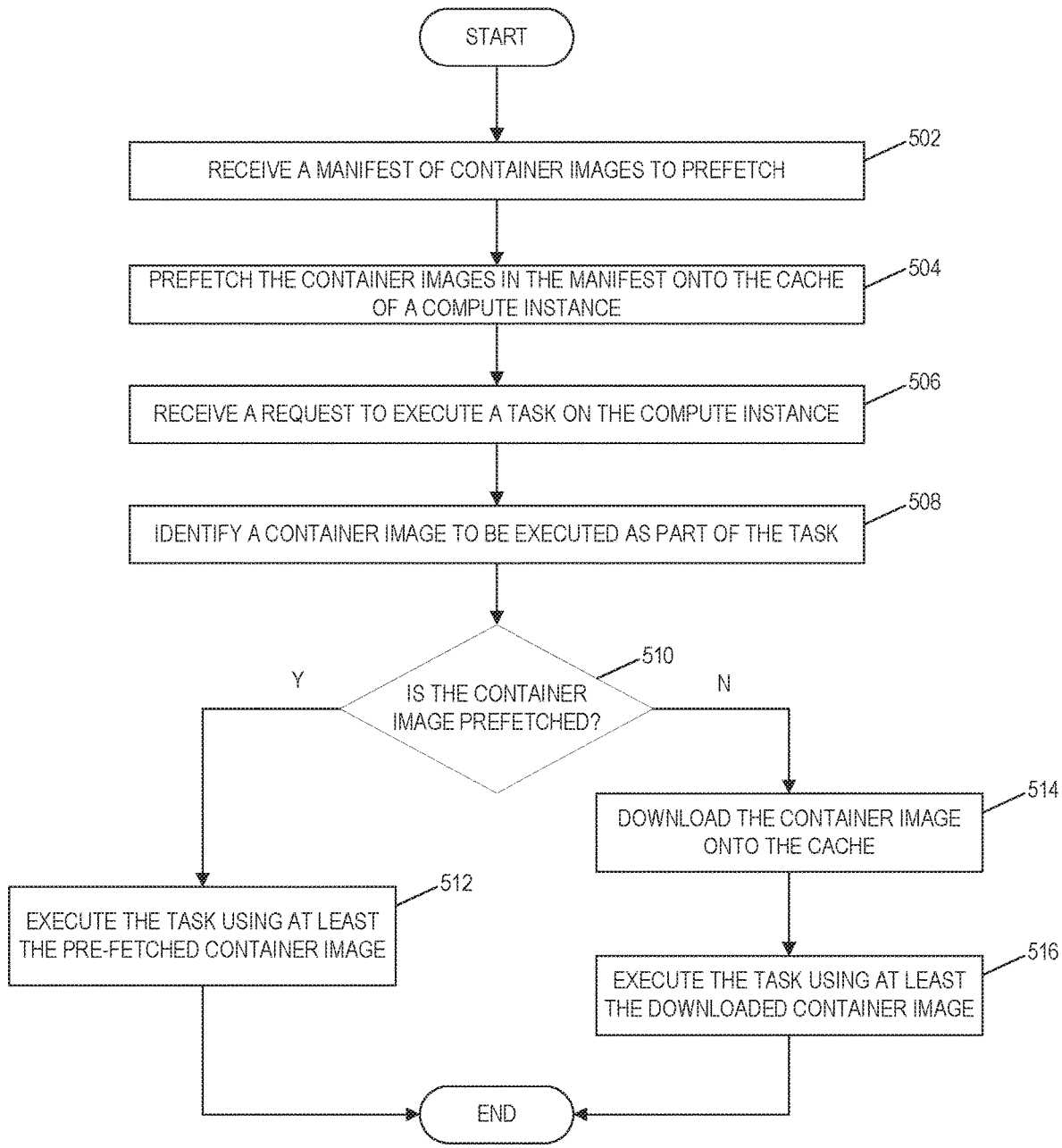
FIG. 5 is a flowchart of an example process for executing a task in accordance with aspects of the present disclosure.

FIG. 5 depicts an illustrative routine 500 for executing a task in accordance with aspects of the present disclosure. The routine 500 may be carried out, for example, by the container service 140 (or a component thereof such as the image prefetching manager 142) or one or more other components of the cloud provider network 120 described herein. For convenience, some or all of the steps of the routine 500 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 500.

The routine 500 begins at block 502, at which the container service 140 receives a manifest of container images to prefetch for a cluster provided by the container service 140. In response, the container service 140 may store the manifest in association with the cluster (e.g., in a cluster manifest repository) so that the container service 140 can publish the manifest to newly added compute capacity and also utilize the information included in the manifest for handling a task execution request received by the container service 140.

At block 504, the container service 140 prefetches the container images in the manifest onto the cache of a compute instance in the cluster. For example, the container service 140 may prefetch the container images onto the caches of all of the compute instances in the cluster. As another example, the container service 140 may prefetch the container images onto the caches of only a subset of the compute instances in the cluster. As another example, the container service 140 may prefetch the container images onto the caches of compute instances that are added to the cluster subsequent to the receipt of the manifest at block 502.

At block 506, the container service 140 receives a request to execute a task on a compute instance in the cluster. The request may include a task definition indicating the one or more container images needed to execute the task and one or more computing resource requirements associated with the task.

At block 508, the container service 140 identifies a container image to be executed as part of the task. For example, the container service 140 may process the task definition associated with the request and determine which container images are needed to execute the requested task. Based on the information provided in the task definition and the available capacity in the cluster, the container service 140 may then identify a compute instance to be used to execute the requested task.

At block 510, the container service 140 determines whether the container image needed to execute the task has been prefetched and stored in the cache of the compute instance. If the container service 140 determines that the container image is stored in the cache of the compute instance, the routine 500 proceeds to block 512, at which the container service 140 causes the task to be executed on the compute instance using the prefetched container image stored in the cache of the compute instance. For example, the container service 140 may refrain, based at least on the determination that the container image has been prefetched and stored in the cache of the virtual machine instance, from requesting the container image from the container registry service 130 or another image repository. If the container service 140 determines that the container image is not stored in the cache of the compute instance, the routine 500 proceeds to block 514. Although not shown in FIG. 5, the container service 140 may also perform cache validation at block 510 as described with reference to FIG. 3, and if the cache validation does not pass, the routine 500 may proceed to block 514 instead of block 512 even if the container service 140 determines at block 510 that the container image is prefetched.

At block 514, the container service 140 causes the container image to be downloaded onto the cache of the compute instance. For example, the container service 140 may request the container image from one or more of the image repositories (e.g., repositories 132) in the ordered list provided in the cluster manifest associated with the cluster. As another example, the container service 140 may request the container image from one or more of the default or fallback repositories included in the cluster manifest associated with the cluster.

At block 516, the container service 140 causes the task to be executed on the compute instance using the container image downloaded onto the cache of the compute instance at block 514. The routine 500 may then end.

The routine 500 can include fewer, more, or different blocks than those illustrated in FIG. 5 and/or one or more blocks illustrated in FIG. 5 may be modified, omitted, or switched without departing from the spirit and scope of the description. In some embodiments, different sets of container images or container image layers (which are the building blocks that make up a given container image) are precached at different sets of servers (e.g., compute instances or other physical machines). In such embodiments, the container service 140 may select the appropriate one for placement at launch (e.g., in response to the requested received at block 506) based on the container images or container image layers identified at block 508. For example, the container service 140 may select the compute instance to be used for executing the container images based on what portion of the container images or container image layers identified at block 508 are stored in the cache of the compute instance or select the compute instance that would result in the shortest launch time (e.g., including the time it takes to download the container images or container image layers not stored in the cache of the compute instance). Moreover, it will be appreciated by those skilled in the art and others that some or all of the functions described in this disclosure may be embodied in software executed by one or more processors of the cloud provider network 120 and/or the user computing device 102 disclosed herein.

Example Routine for Processing a Cluster Manifest

Figure 6:
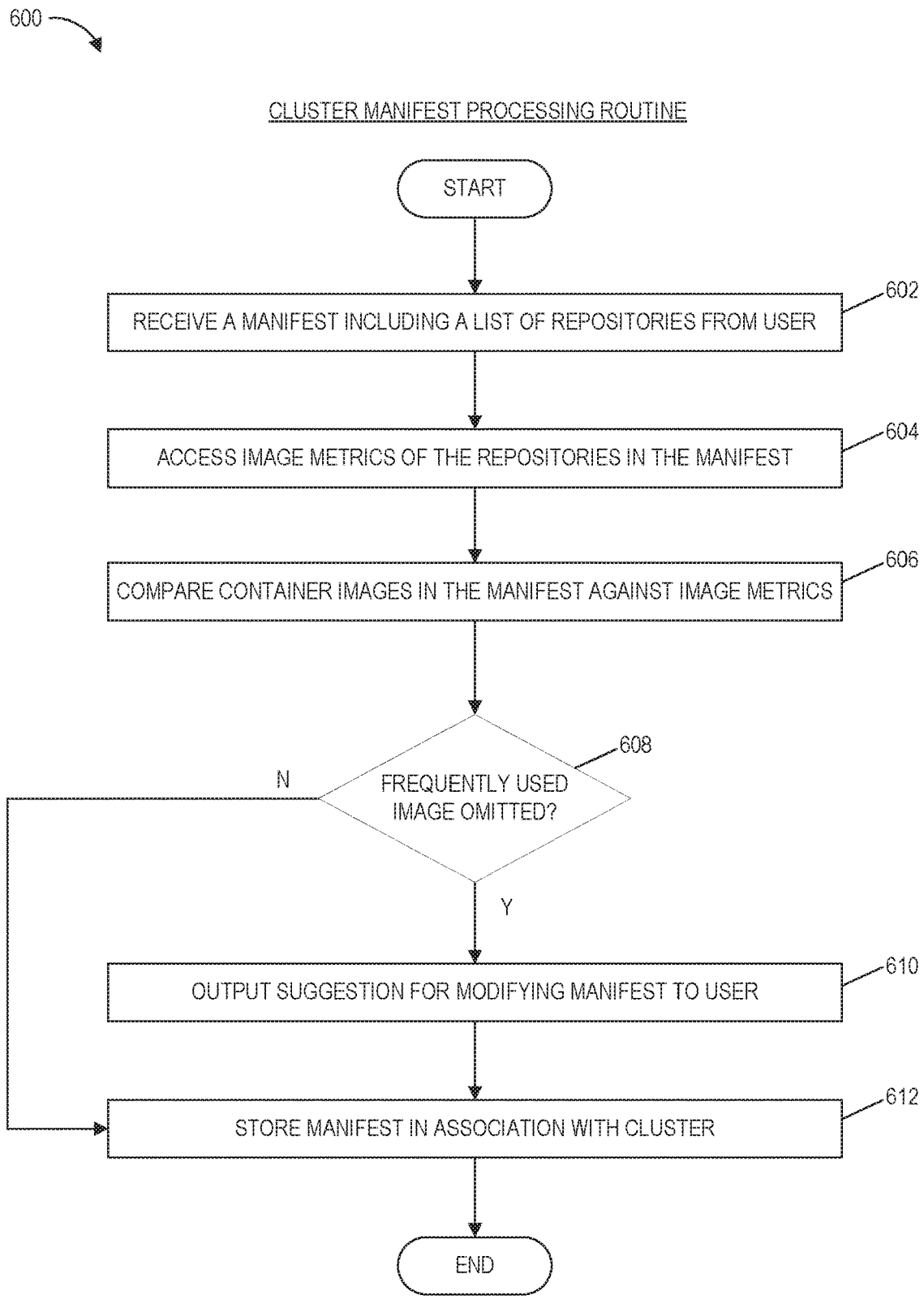
FIG. 6 is a flowchart of an example process for processing a cluster manifest in accordance with aspects of the present disclosure.

FIG. 6 depicts an illustrative routine 600 for processing a cluster manifest in accordance with aspects of the present disclosure. The routine 600 may be carried out, for example, by the container service 140 (or a component thereof such as the image prefetching manager 142) or one or more other components of the cloud provider network 120 described herein. For convenience, some or all of the steps of the routine 600 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 600.

The routine 600 begins at block 602, at which the container service 140 receives, from a user computing device 102, a manifest including a list of repositories for a cluster provided by the container service 140.

At block 604, the container service 140 accesses the image metrics (e.g., image metrics 136) associated with the repositories in the manifest. The image metrics may indicate how frequently the container images in the given repository have each been accessed. Using the image metrics, the container service 140 may determine a set of container images that are most frequently accessed (e.g., by this specific user, by this specific cluster, or overall).

At block 606, the container service 140 compares the container images in the manifest against the image metrics.

At block 608, the container service 140 determines whether any of the frequently used images indicated by the image metrics is omitted from the manifest. If the container service 140 determines that none of the frequently used images is omitted from the manifest, the routine 600 proceeds to block 612. Otherwise, the routine proceeds to block 610.

At block 610, the container service 140 outputs, to the user computing device 102, a suggestion for modifying the manifest. For example, the suggestion may include adding one or more additional container images to the manifest. As another example, the suggestion may include replacing one or more of the container images included in the manifest with one or more other container images indicated by the image metrics as being more frequently used than the one or more container images included in the manifest. In some embodiments, the container service 140 automatically modifies the manifest according to the suggestion.

At block 612, the container service 140 stores the manifest in association with the cluster. The routine 600 may then end.

The routine 600 can include fewer, more, or different blocks than those illustrated in FIG. 6 and/or one or more blocks illustrated in FIG. 6 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Modifying a Cluster Manifest

Figure 7:
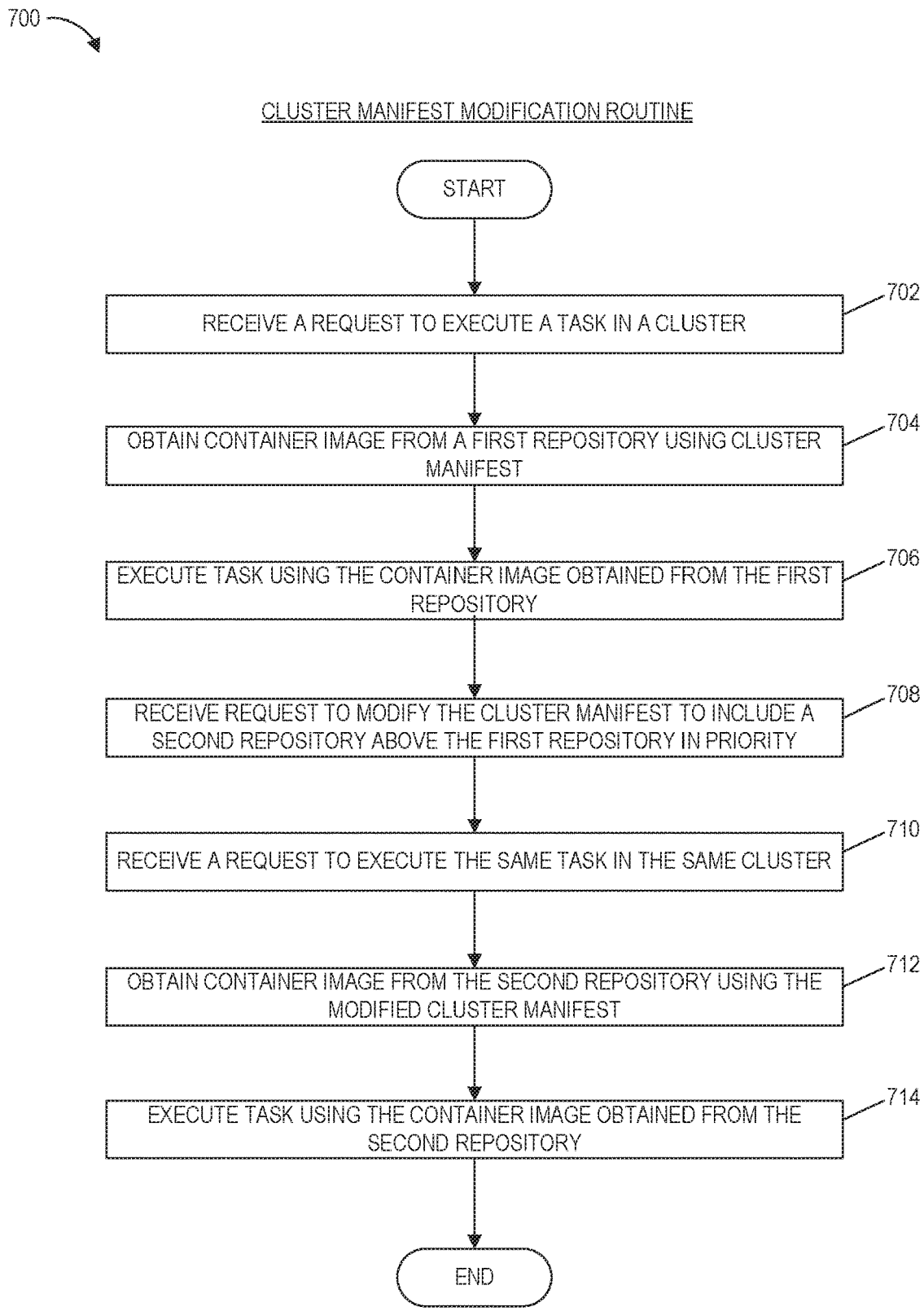
FIG. 7 is a flowchart of an example process for modifying a cluster manifest in accordance with aspects of the present disclosure.

FIG. 7 depicts an illustrative routine 700 for modifying a cluster manifest in accordance with aspects of the present disclosure. The routine 700 may be carried out, for example, by the container service 140 (or a component thereof such as the image prefetching manager 142) or one or more other components of the cloud provider network 120 described herein. For convenience, some or all of the steps of the routine 700 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 700.

The routine 700 begins at block 702, at which the container service 140 receives a request to execute a task in a cluster. The request may include a task definition indicating the one or more container images needed to execute the task and one or more computing resource requirements associated with the task.

At block 704, the container service 140 obtains a container image needed to execute the task from a first repository included in the cluster manifest associated with the cluster.

At block 706, the container service 140 executes the task using the container image obtained from the first repository.

At block 708, the container service 140 receives a request to modify the cluster manifest associated with the cluster to include a second repository above the first repository in priority. For example, the modified cluster manifest may provide, in an ordered list, the second repository and the first repository, where the second repository precedes the first repository in the ordered list.

At block 710, the container service 140 receives another request to execute the same task as that used at block 706 in the same cluster as that used at block 706. For example, the task definition associated with the request received at block 710 may be identical to the task definition associated with the request received at block 702. As another example, the task definition associated with the request received at block 710 may not be identical to the task definition associated with the request received at block 702, but the container image(s) identified in the task definition associated with the request received at block 702 may be identical to the container image(s) identified in the task definition associated with the request received at block 702.

At block 712, the container service 140 obtains a container image from the second repository using the modified cluster manifest. The container image may be different from the one obtained at block 704 despite the task definition and/or the identification of the container image may have been the same.

At block 714, the container service 140 executes the task using the container image obtained from the second repository. The routine 700 may then end.

As illustrated in FIG. 7, a user may be able to make changes to a container image without touching the container image (e.g., since the container image may belong to another developer or the user may not have permission to make such changes). For example, the user may store a modified version of the container image in a second repository (e.g., but using the same container image name), and modify the cluster manifest so that the second repository is higher in priority than the existing repositories. By doing so, the user can cause the container service 140 to handle future task executions using the container image from the second repository rather than the one from the other existing repository (since the second repository would be higher in priority and contacted first by the container service 140).

The manifest modification techniques described with reference to FIG. 7 can also be used to bypass an unavailable or problematic repository. For example, if the user is aware that the repository from which the container image needs to be downloaded is taking too long to respond or is temporarily unavailable, rather than waiting for the repository to become accessible again, the user can modify the manifest to insert another repository that the user knows to be available from which the same container image can be downloaded.

Although not illustrated in FIG. 7, prior to accessing the container images from the repositories, the container service 140 may check the cache of the instance on which the task is to be executed. The container images in the cache may indicate the repository from which the container image was downloaded. Thus, at block 712, the container service 140 may check the cache, determine whether the cache includes a copy of the container image from the second repository (e.g., the highest one on the ordered list). If the container service 140 determines that the cache does not include a copy of the container image from the second repository, the container service 140 checks whether the second repository has a copy of the container image (e.g., regardless of whether the cache includes a copy of the container image from any other repository), and downloads the container image from the second repository.

Here, at block 712, the cache may include a copy of the container image, since the container image downloaded from the first repository was used to execute the task at block 706. However, since the copy from the first repository may be different from a copy stored in the second repository, the container service 140 first tries the second repository. In the event that the second repository does not have a copy of the container image, the container service 140 may then use the copy of the container image in the cache for executing the task.

The routine 700 can include fewer, more, or different blocks than those illustrated in FIG. 7 and/or one or more blocks illustrated in FIG. 7 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Executing a Task Using the Cluster Manifest as a Whitelist

FIG. 7 depicts an illustrative routine 700 for executing a task using the cluster manifest as a whitelist in accordance with aspects of the present disclosure. The routine 800 may be carried out, for example, by the container service 140 (or a component thereof such as the image prefetching manager 142) or one or more other components of the cloud provider network 120 described herein. For convenience, some or all of the steps of the routine 800 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 800.

The routine 800 begins at block 802, at which the container service 140 receives a request to execute a task in a cluster. The request may include a task definition indicating the one or more container images needed to execute the task and one or more computing resource requirements associated with the task.

At block 804, the container service 140 accesses the cluster manifest for the cluster in which the task execution is requested. For example, the cluster manifest may indicate an ordered list of image repositories and a set of container images that are likely to be executed on the cluster.

At block 806, the container service 140 accesses one or more repositories provided in the cluster manifest to download a container image needed for executing the task.

At block 808, the container service 140 determines whether the one or more repositories contain the requested container image. If the container service 140 determines that the one or more repositories contain the requested container image, the routine 800 proceeds to block 810. Otherwise, the routine 800 proceeds to block 814, at which the container service 140 rejects the request received at block 802.

At block 810, the container service 140 obtains the container image from one of the one or more repositories. For example, the container service 140 may store the container image in the cache of a compute instance in the cluster.

At block 812, the container service 140 executes the task using the obtained container image. The routine 800 may then end.

Figure 8:
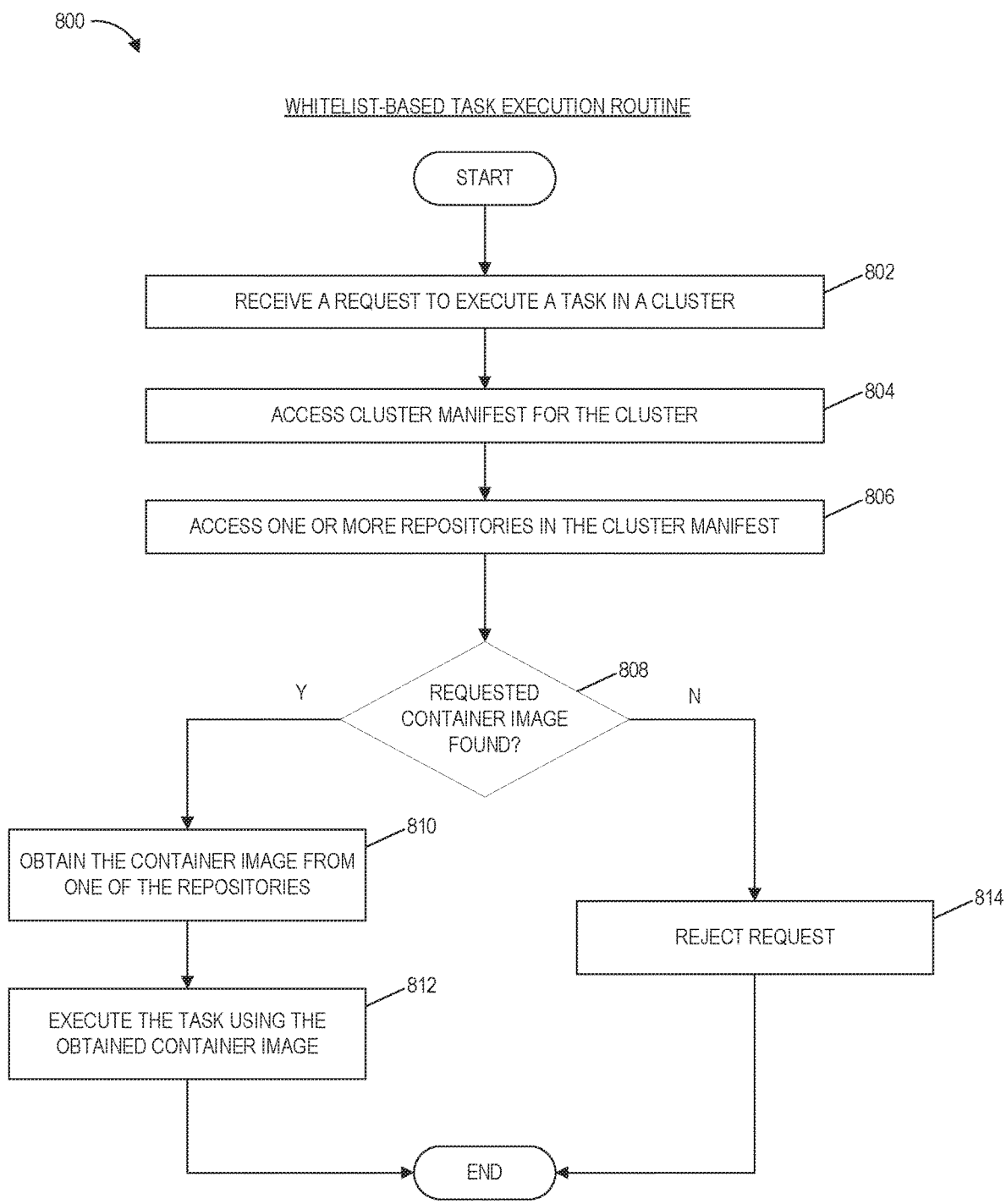
FIG. 8 is a flowchart of an example process for executing a task using the cluster manifest as a whitelist in accordance with aspects of the present disclosure.

The routine 800 can include fewer, more, or different blocks than those illustrated in FIG. 8 and/or one or more blocks illustrated in FIG. 8 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Container Service

Figure 9:
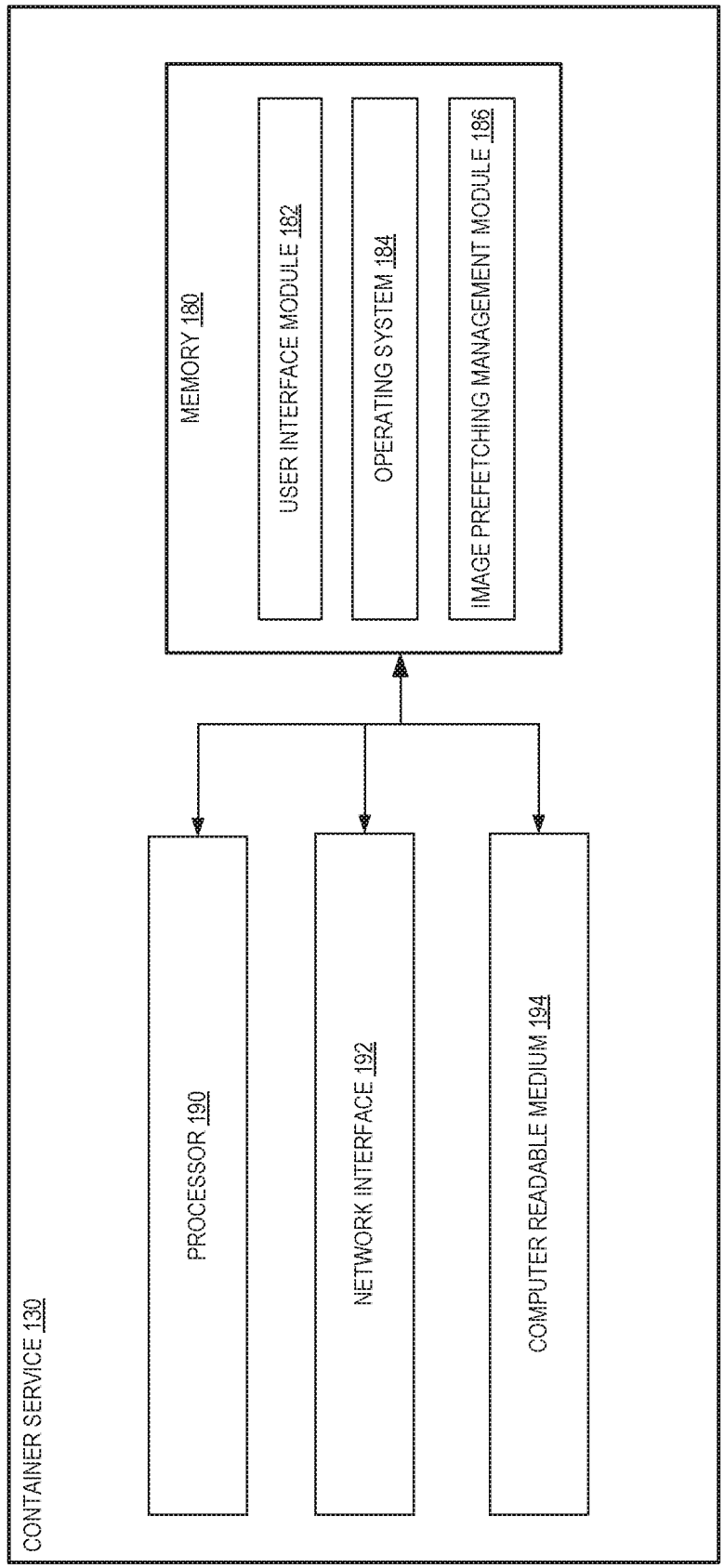
FIG. 9 depicts a general architecture of a computing device or system providing a container service in accordance with aspects of the present disclosure.

FIG. 9 depicts an example architecture of a computing system (referred to as the container service 140) that can be used to perform one or more of the techniques described herein or illustrated in FIGS. 1-8. The general architecture of the container service 140 depicted in FIG. 9 includes an arrangement of computer hardware and software modules that may be used to implement one or more aspects of the present disclosure. The container service 140 may include many more (or fewer) elements than those shown in FIG. 9. It is not necessary, however, that all of these elements be shown in order to provide an enabling disclosure. As illustrated, the container service 140 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the container service 140. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 182, the memory 180 may include an image prefetching management module 186 that may be executed by the processor 190. In one embodiment, the image prefetching management module 186 implements various aspects of the present disclosure, e.g., those illustrated in FIGS. 1-8 or described with reference to FIGS. 1-8.

While the image prefetching management module 186 is shown in FIG. 9 as part of the container service 140, in other embodiments, all or a portion of the image prefetching management module 186 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the container service 140. It will also be appreciated that, in some embodiments, a user computing device (e.g., the user computing device 102 of FIG. 1) may implement functionality that is otherwise described herein as being implemented by the elements and/or modules of the container service 140. For example, the user computing device 102 may receive code modules or other instructions from the container service 140 and/or other components of the cloud provider network 120 via the network 104 that are executed by the user computing device 102 to implement various aspects of the present disclosure.

Although a single processor, a single network interface, a single computer-readable medium, and a single memory are illustrated in the example of FIG. 9, in other implementations, the container service 140 can have a multiple of one or more of these components (e.g., two or more processors and/or two or more memories).

Example Implementations (EIs)

Some enumerated example implementations (EIs) are provided in this section, without limitation.

EI 1: A cloud provider system comprising: a set of clusters hosted on a plurality of physical machines, wherein each cluster in the set of clusters includes a virtual machine configured to perform tasks; a container registry service providing a plurality of image repositories, wherein each image repository of the plurality of image repositories is configured to at least store a plurality of container images that are executable on the virtual machines of the set of clusters; a cluster manifest repository configured to at least store a plurality of cluster manifests, wherein each cluster manifest of the plurality of cluster manifests is associated with a cluster in the set of clusters; and a container service comprising computer hardware, wherein the container service is configured to at least: receive, from a user computing device, a request to associate a first cluster manifest with a first cluster in the set of clusters, wherein the first cluster is configured to execute a task on behalf of a user of the user computing device, and wherein the first cluster manifest indicates (i) an ordered list of image repositories provided by the container registry service, and (ii) a set of container images expected to be loaded onto the first cluster as part of a future task execution; store the first cluster manifest in association with the first cluster in the cluster manifest repository; receive, from the user computing device, a request to add a first virtual machine to the first cluster such that the first virtual machine is usable to provide compute capacity to the first cluster, wherein the first virtual machine is assigned to the user of the user computing device; add the first virtual machine to the first cluster; access the first cluster manifest associated with the first cluster; download, from an image repository in the ordered list indicated by the first cluster manifest, the set of container images indicated by the first cluster manifest, wherein the set of container images indicated by the first cluster manifest is downloaded onto a cache of the first virtual machine; subsequent to downloading the set of container images onto the cache of the first virtual machine, receive a request to execute a first task in the first cluster, wherein the first task at least includes the set of container images downloaded onto the cache of the first virtual machine; and cause the first task to be executed on the first virtual machine, wherein to cause the first task to be executed on the first virtual machine, the container service is configured to at least access the set of container images from the cache of the first virtual machine.

EI 2: The cloud provider system of any preceding EI or any combination of the preceding EIs, wherein the container service is further configured to at least: determine that the set of container images are stored in the cache of the first virtual machine; and refrain, based at least on said determining, from requesting the set of container images from the container registry service.

EI 3: The cloud provider system of any preceding EI or any combination of the preceding EIs, wherein the container service is further configured to at least, for each container image in the set of container images: generate a hash value for the container image; obtain, from the container registry service, a hash value corresponding to the container image; and determine that the hash value generated for the container image corresponds to the hash value obtained for the container image.

EI 4: The cloud provider system of any preceding EI or any combination of the preceding EIs, wherein the container service is further configured to at least prefetch, onto the cache of the first virtual machine, a container image not indicated in the first cluster manifest, wherein the container image not indicated in the first cluster manifest is prefetched from a first repository of the repositories in the ordered list, and wherein to prefetch the container image not indicated in the first cluster manifest, the container service is further configured to at least access an image metric associated with the first repository.

EI 5: A computer-implemented method comprising: providing a first cluster of compute resources that are configured to perform tasks, wherein the first cluster is associated with a first cluster manifest indicating at least an ordered list of image repositories; receiving a request to add a first compute resource to the first cluster; adding the first compute resource to the first cluster such that the first compute resource is usable to handle a task execution request received by the first cluster; accessing the first cluster manifest associated with the first cluster; causing, based at least in part on the ordered list of image repositories indicated by the first cluster manifest, a container image to be stored in a cache associated with the first compute resource; receiving a request to execute a first task in the first cluster, wherein the first task includes the container image stored in the cache associated with the first compute resource; and causing the first task to be executed on the first compute resource based at least in part on the container image stored in the cache of the first compute resource.

EI 6: The computer-implemented method of any preceding EI or any combination of the preceding EIs, wherein the compute resources in the first cluster include at least one of a virtual machine instance, a bare-metal instance, a physical machine, a container, a node, or an offload card.

EI 7: The computer-implemented method of any preceding EI or any combination of the preceding EIs, further comprising determining, based at least in part on the ordered list of image repositories, a container image that is likely to be accessed as part of a future task execution.

EI 8: The computer-implemented method of any preceding EI or any combination of the preceding EIs, further comprising obtaining image metrics data associated with an image repository in the ordered list of repositories indicated by the first cluster manifest, wherein the image metrics data identifies a container image that has been most frequently accessed.

EI 9: The computer-implemented method of any preceding EI or any combination of the preceding EIs, further comprising: requesting a first container image from a first image repository in the ordered list of image repositories; and in response to determining that the first image repository does not include the first container image, requesting the first container image from a second image repository in the ordered list of image repositories, wherein the first image repository precedes the second image repository in the ordered list.

EI 10: The computer-implemented method of any preceding EI or any combination of the preceding EIs, further comprising, in response to determining that the second image repository includes the first container image, refraining from requesting the first container image from a third image repository in the ordered list of image repositories, wherein the second image repository precedes the third image repository in the ordered list.

EI 11: The computer-implemented method of any preceding EI or any combination of the preceding EIs, further comprising, in response to the request to execute the first task in the first cluster, requesting a first container image that is not indicated by the first cluster manifest from an image repository not indicated by the first cluster manifest.

EI 12: The computer-implemented method of any preceding EI or any combination of the preceding EIs, wherein the first cluster manifest further indicates that a container image not in any of the image repositories in the ordered list should be requested from an image repository not included in the ordered list.

EI 13: A non-transitory computer-readable medium storing instructions that, when executed by a computing system, cause the computing system to at least: provide a first cluster of compute resources that are configured to perform tasks, wherein the first cluster is associated with a first cluster manifest indicating at least an ordered list of image repositories; receive a request to add a first compute resource to the first cluster; add the first compute resource to the first cluster such that the first computer resource is usable to handle a task execution request received by the first cluster; access the first cluster manifest associated with the first cluster; cause, based at least in part on the ordered list of image repositories indicated by the first cluster manifest, a container image to be stored in a cache associated with the first compute resource; receive a request to execute a first task in the first cluster, wherein the first task at least includes the container image stored in the cache associated with the first compute resource; and cause the first task to be executed on the first compute resource based at least in part on the container image stored in the cache of the first compute resource.

EI 14: The non-transitory computer-readable medium of any preceding EI or any combination of the preceding EIs, storing further instructions, that when executed by the computing system, cause the computing system to at least determine, based at least in part on the ordered list of image repositories, the container image that is likely to be accessed as part of a future task execution.

EI 15: The non-transitory computer-readable medium of any preceding EI or any combination of the preceding EIs, storing further instructions, that when executed by the computing system, cause the computing system to at least obtain image metrics data associated with an image repository in the ordered list of repositories indicated by the first cluster manifest, wherein the image metrics data identifies the container image that has been most frequently accessed.

EI 16: The non-transitory computer-readable medium of any preceding EI or any combination of the preceding EIs, storing further instructions, that when executed by the computing system, cause the computing system to determine, based at least in part on the image metrics data, that the container image satisfies a condition for being prefetched onto the cache associated with the first compute resource.

EI 17: The non-transitory computer-readable medium of any preceding EI or any combination of the preceding EIs, storing further instructions, that when executed by the computing system, cause the computing system to at least: request a first container image from a first image repository in the ordered list of image repositories; and in response to determining that the first image repository does not include the first container image, request the first container image from a second image repository in the ordered list of image repositories, wherein the first image repository precedes the second image repository in the ordered list.

EI 18: The non-transitory computer-readable medium of any preceding EI or any combination of the preceding EIs, storing further instructions, that when executed by the computing system, cause the computing system to at least: in response to determining that the second image repository includes the first container image, refrain from requesting the first container image from a third image repository in the ordered list of image repositories, wherein the second image repository precedes the third image repository in the ordered list.

EI 19: The non-transitory computer-readable medium of any preceding EI or any combination of the preceding EIs, storing further instructions, that when executed by the computing system, cause the computing system to at least: in response to the request to execute the first task in the first cluster, request a first container image that is not indicated by the first cluster manifest from an image repository not indicated by the first cluster manifest.

EI 20: The non-transitory computer-readable medium of any preceding EI or any combination of the preceding EIs, wherein the first cluster manifest further indicates the container image to be stored in a cache associated with the first compute resource.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
a set of clusters hosted on a plurality of physical machines, wherein each cluster in the set of clusters includes a virtual machine configured to perform tasks;
a container registry service providing a plurality of image repositories, wherein each image repository of the plurality of image repositories is configured to at least store a plurality of container images that are executable on the virtual machines of the set of clusters;
a cluster manifest repository configured to at least store a plurality of cluster manifests, wherein each cluster manifest of the plurality of cluster manifests is associated with a cluster in the set of clusters; and
a container service comprising computer hardware, wherein the container service is configured to at least:
receive, from a user computing device, a request to associate a first cluster manifest with a first cluster in the set of clusters, wherein the first cluster is configured to execute a task on behalf of a user of the user computing device, and wherein the first cluster manifest indicates (i) an ordered list of image repositories provided by the container registry service, and (ii) a set of container images expected to be loaded onto the first cluster as part of a future task execution;
store the first cluster manifest in association with the first cluster in the cluster manifest repository;
receive, from the user computing device, a request to add a first virtual machine to the first cluster such that the first virtual machine is usable to provide compute capacity to the first cluster, wherein the first virtual machine is assigned to the user of the user computing device;
add the first virtual machine to the first cluster;
access the first cluster manifest associated with the first cluster;
download, from an image repository in the ordered list indicated by the first cluster manifest, the set of container images indicated by the first cluster manifest, wherein the set of container images indicated by the first cluster manifest is downloaded onto a cache of the first virtual machine;
subsequent to downloading the set of container images onto the cache of the first virtual machine, receive a request to execute a first task in the first cluster, wherein the first task at least includes the set of container images downloaded onto the cache of the first virtual machine; and
cause the first task to be executed on the first virtual machine, wherein to cause the first task to be executed on the first virtual machine, the container service is configured to at least access the set of container images from the cache of the first virtual machine.

2. The cloud provider system of claim 1, wherein the container service is further configured to at least:
determine that the set of container images are stored in the cache of the first virtual machine; and
refrain, based at least on said determining, from requesting the set of container images from the container registry service.

3. The cloud provider system of claim 1, wherein the container service is further configured to at least:
for each container image in the set of container images, generate a hash value for the container image;
obtain, from the container registry service, a hash value corresponding to the container image; and
determine that the hash value generated for the container image corresponds to the hash value obtained for the container image.

4. The cloud provider system of claim 1, wherein the container service is further configured to at least prefetch, onto the cache of the first virtual machine, a container image not indicated in the first cluster manifest, wherein the container image not indicated in the first cluster manifest is prefetched from a first repository of the repositories in the ordered list, and wherein to prefetch the container image not indicated in the first cluster manifest, the container service is further configured to at least access an image metric associated with the first repository.

5. A computer-implemented method comprising:
providing, by a container service, a first cluster of compute resources that are configured to perform tasks, wherein the first cluster is associated with a first cluster manifest of a plurality of cluster manifests that is stored in a cluster manifest repository and indicates at least (i) an ordered list of image repositories and (ii) a set of container images expected to be loaded onto the first cluster as part of a future task execution;
receiving, from a user computing device, a request to add a first compute resource to the first cluster, wherein the first compute resource is assigned to a user of the user computing device;
adding the first compute resource to the first cluster such that the first compute resource is usable to handle a task execution request received by the first cluster;
accessing the first cluster manifest associated with the first cluster;
causing a container image from a container registry service providing at least the ordered list of image repositories indicated by the first cluster manifest to be stored in a cache associated with the first compute resource;
subsequent to causing the container image to be stored in the cache of the first compute resource, receiving a request to execute a first task in the first cluster, wherein the first task includes the container image stored in the cache associated with the first compute resource; and
causing, by the container service, the first task to be executed on the first compute resource based at least in part on the container image stored in the cache of the first compute resource.

6. The computer-implemented method of claim 5, wherein the compute resources in the first cluster include at least one of a virtual machine instance, a bare-metal instance, a physical machine, a container, a node, or an offload card.

7. The computer-implemented method of claim 5, further comprising determining, based at least in part on the ordered list of image repositories, a container image that is likely to be accessed as part of a future task execution.

8. The computer-implemented method of claim 5, further comprising obtaining image metrics data associated with an image repository in the ordered list of repositories indicated by the first cluster manifest, wherein the image metrics data identifies a container image that has been most frequently accessed.

9. The computer-implemented method of claim 5, further comprising:
requesting a first container image from a first image repository in the ordered list of image repositories; and in response to determining that the first image repository does not include the first container image, requesting the first container image from a second image repository in the ordered list of image repositories, wherein the first image repository precedes the second image repository in the ordered list.

10. The computer-implemented method of claim 9, further comprising, in response to determining that the second image repository includes the first container image, refraining from requesting the first container image from a third image repository in the ordered list of image repositories, wherein the second image repository precedes the third image repository in the ordered list.

11. The computer-implemented method of claim 5, further comprising, in response to the request to execute the first task in the first cluster, requesting a first container image that is not indicated by the first cluster manifest from an image repository not indicated by the first cluster manifest.

12. The computer-implemented method of claim 5, wherein the first cluster manifest further indicates that a container image not in any of the image repositories in the ordered list should be requested from an image repository not included in the ordered list.

13. A non-transitory computer-readable medium storing instructions that, when executed by a computing system, cause the computing system to at least:
provide a first cluster of compute resources that are configured to perform tasks, wherein the first cluster is associated with a first cluster manifest of a plurality of cluster manifests that is stored in a cluster manifest repository and indicates at least (i) an ordered list of image repositories and (ii) a set of container images expected to be loaded onto the first cluster as part of a future task execution;
receive, from a user computing device, a request to add a first compute resource to the first cluster, wherein the first compute resource is assigned to a user of the user computing device;
add the first compute resource to the first cluster such that the first computer resource is usable to handle a task execution request received by the first cluster;
access the first cluster manifest associated with the first cluster;
cause a container image from a container registry service providing at least the ordered list of image repositories indicated by the first cluster manifest to be stored in a cache associated with the first compute resource;
subsequent to causing the container image to be stored in the cache of the first compute resource, receive a request to execute a first task in the first cluster, wherein the first task at least includes the container image stored in the cache associated with the first compute resource; and
cause the first task to be executed on the first compute resource based at least in part on the container image stored in the cache of the first compute resource.

14. The non-transitory computer-readable medium of claim 13, storing further instructions, that when executed by the computing system, cause the computing system to at least determine, based at least in part on the ordered list of image repositories, the container image that is likely to be accessed as part of a future task execution.

15. The non-transitory computer-readable medium of claim 13, storing further instructions, that when executed by the computing system, cause the computing system to at least obtain image metrics data associated with an image repository in the ordered list of repositories indicated by the first cluster manifest, wherein the image metrics data identifies the container image that has been most frequently accessed.

16. The non-transitory computer-readable medium of claim 15, storing further instructions, that when executed by the computing system, cause the computing system to determine, based at least in part on the image metrics data, that the container image satisfies a condition for being prefetched onto the cache associated with the first compute resource.

17. The non-transitory computer-readable medium of claim 13, storing further instructions, that when executed by the computing system, cause the computing system to at least:
request a first container image from a first image repository in the ordered list of image repositories; and
in response to determining that the first image repository does not include the first container image, request the first container image from a second image repository in the ordered list of image repositories, wherein the first image repository precedes the second image repository in the ordered list.

18. The non-transitory computer-readable medium of claim 17, storing further instructions, that when executed by the computing system, cause the computing system to at least:
in response to determining that the second image repository includes the first container image, refrain from requesting the first container image from a third image repository in the ordered list of image repositories, wherein the second image repository precedes the third image repository in the ordered list.

19. The non-transitory computer-readable medium of claim 13, storing further instructions, that when executed by the computing system, cause the computing system to at least:
in response to the request to execute the first task in the first cluster, request a first container image that is not indicated by the first cluster manifest from an image repository not indicated by the first cluster manifest.

20. The non-transitory computer-readable medium of claim 13, wherein the first cluster manifest further indicates the container image to be stored in a cache associated with the first compute resource.

* * * * *